(12) United States Patent
Thomson et al.

(10) Patent No.: US 10,218,715 B2
(45) Date of Patent: Feb. 26, 2019

(54) SECURED NETWORK BRIDGE

(71) Applicant: BAE SYSTEMS plc, London (GB)

(72) Inventors: James Richard Thomson, Guildford (GB); Jonathan Roy Paisley, Guilford (GB); Christopher Guy Sabey, Guilford (GB); Richard Christopher Charles Byng, Guilford (GB)

(73) Assignee: BAE SYSTEMS PLC, London (GB)

( * ) Notice: Subject to any disclaimer, the term of this patent is extended or adjusted under 35 U.S.C. 154(b) by 146 days.

(21) Appl. No.: 15/316,701

(22) PCT Filed: Jun. 3, 2015

(86) PCT No.: PCT/GB2015/051621
§ 371 (c)(1),
(2) Date: Dec. 6, 2016

(87) PCT Pub. No.: WO2015/185926
PCT Pub. Date: Dec. 10, 2015

(65) Prior Publication Data
US 2017/0171220 A1 Jun. 15, 2017

(30) Foreign Application Priority Data
Jun. 6, 2014 (GB) .................................. 1410089.5

(51) Int. Cl.
*H04L 29/06* (2006.01)
*H04L 12/861* (2013.01)
(Continued)

(52) U.S. Cl.
CPC ............ *H04L 63/126* (2013.01); *H04L 49/90* (2013.01); *H04L 63/0209* (2013.01);
(Continued)

(58) Field of Classification Search
CPC ....... H04L 63/126; H04L 49/90; H04L 63/02; H04L 63/0209; H04L 63/0227;
(Continued)

(56) References Cited

U.S. PATENT DOCUMENTS 6,092,191 A * 7/2000 Shimbo ............... H04L 63/0428
380/258
6,118,771 A * 9/2000 Tajika ................... H04L 12/185
370/328
(Continued)

FOREIGN PATENT DOCUMENTS

| CN | 102208982 A | 10/2011 |
|---|---|---|
| GB | 2503245 A | 12/2013 |
| WO | WO 2013/190289 A1 | 12/2013 |

OTHER PUBLICATIONS

International Search Report and Written Opinion dated Aug. 27, 2015 issued in PCT/GB2015/051621.
(Continued)

*Primary Examiner* — Jayesh M Jhaveri
(74) *Attorney, Agent, or Firm* — Scully, Scott, Murphy & Presser, P.C.

(57) ABSTRACT

An apparatus and method are provided for implementing one or more security services to messages and data being communicated between a first network and a second network. In particular, a network bridge device is provided for applying communications security services to data passing by means of the device from a first network to a second network, the device having a first network interface for linking to the first network, a second network interface for linking to the second network, and a unidirectional link between the first and second network interfaces within the device incorporating a first hardware logic module, configured to apply one or more predetermined data security functions to message data received via the first network
(Continued)

interface, and a second hardware logic module, arranged to apply a predetermined scheme for authentication of the source of messages passing through the device.

14 Claims, 5 Drawing Sheets

(51) Int. Cl.
   H04L 9/30     (2006.01)
   G06F 19/00    (2018.01)
   G06F 21/00    (2013.01)

(52) U.S. Cl.
   CPC .......... *H04L 63/0227* (2013.01); *H04L 63/08* (2013.01); *H04L 63/105* (2013.01); *H04L 63/20* (2013.01); *G06F 19/00* (2013.01); *G06F 21/00* (2013.01); *H04L 9/30* (2013.01); *H04L 63/02* (2013.01); *H04L 63/083* (2013.01); *H04L 63/0876* (2013.01)

(58) Field of Classification Search
   CPC ......... H04L 63/08; H04L 63/20; H04L 29/06; H04L 12/861; H04L 9/30; H04L 63/083; H04L 63/0876; G06F 19/00; G06F 21/00
   See application file for complete search history.

(56) References Cited

U.S. PATENT DOCUMENTS

| | | | |
|---|---|---|---|
| 7,873,825 B2* | 1/2011 | Jokela | H04L 29/12018 709/227 |
| 7,992,209 B1 | 8/2011 | Menoher et al. | |
| 8,228,818 B2* | 7/2012 | Chase | H04L 43/12 370/232 |
| 9,686,284 B2* | 6/2017 | Shah | H04L 63/0884 |
| 2003/0026426 A1* | 2/2003 | Wright | H04L 12/462 380/270 |
| 2003/0120763 A1* | 6/2003 | Volpano | H04L 12/4641 709/223 |
| 2006/0165108 A1 | 7/2006 | Uysal | |
| 2010/0299742 A1 | 11/2010 | Declety et al. | |
| 2014/0304765 A1* | 10/2014 | Nakamoto | H04L 63/20 726/1 |
| 2015/0347683 A1* | 12/2015 | Ansari | H04L 63/08 726/7 |
| 2017/0171220 A1* | 6/2017 | Thomson | H04L 63/0209 |

OTHER PUBLICATIONS

Great Britain Search Report dated Nov. 28, 2014 issued in GB 1410089.5.
International Preliminary Report on Patentability and Written Opinion dated Dec. 15, 2016 from PCT/GB2015/051621.

* cited by examiner

SECURED NETWORK BRIDGE

This invention relates to network and data security and to secured communications between networks. In particular, but not exclusively, the present invention relates to an apparatus and method for implementing a secured interface for data communications between networks, for example to permit only authenticated messages and verified message data content to pass between a first, high security network and a second, lower security network, or between two or more higher security networks via a lower security network.

It is known to provide a so-called 'firewall' device in the role of a security gateway between networks, for example at a point of interconnection between a private network and a public network such as the Internet. A firewall device may be arranged to implement various checks and impose restrictions upon data intended to pass between the two networks, based for example upon data source or destination network addresses or the presence of certain pre-defined data indicative of the presence of malicious software or undesirable data content. However, known firewall devices are not generally able to meet more stringent requirements on security of network interfaces, for example an ability to counter the possibility of the functionality of a firewall device itself being compromised.

From a first aspect, the present invention resides in a network bridge device for applying communications security services to messages passing by means of the device from a first network to a second network, the device comprising:

a first network interface for linking to the first network and a second network interface for linking to the second network;

a first hardware logic module arranged to receive a message from the first network interface and configured to apply, to the message received from the first network interface, one or more predetermined message content security functions and to output or to block the message received from the first network interface according to the result of applying said one or more functions;

a second hardware logic module configured to apply, to the message received from the first network interface, a predetermined authentication scheme to enable determination that a source of messages is a trusted source, wherein the first network interface is linked to the second network interface by a unidirectional data pathway incorporating the first hardware logic module and the second hardware logic module to ensure unidirectional flow of messages from the first network interface to the second network interface by means of the first and second hardware logic modules.

The network interface device according to this first aspect may be configured to operate as one of a sending and receiving pair of cooperating network bridge devices to provide a secure communications link between two higher security networks by means of a lower security network. In such an arrangement, in a sending device, the second hardware logic module is arranged to apply a digital signature to a received message according to the predetermined authentication scheme. Additionally, or alternatively, the second hardware logic module is arranged to apply an identifier for the device to a received message according to the predetermined authentication scheme. In the receiving device, the second hardware logic module is arranged to authenticate a digital signature applied to a receive message according to the predetermined authentication scheme. Additionally or alternatively, the second hardware logic module is arranged to authenticate an identifier for another network interface device applied to a receive message according to the predetermined authentication scheme.

From a second aspect, the present inventions resides in a network bridge device for applying communications security services to messages passing by means of the device between a first network and a second network, the device comprising:

a first network interface for linking to the first network and a second network interface for linking to the second network;

a first hardware logic module arranged to receive a message from the first network interface and configured to apply, to the message received from the first network interface, a first set of one or more predetermined message content security functions and to output or to block the message received from the first network interface according to the result of applying said first set of one or more functions;

a second hardware logic module configured to apply, to the message received from the first network interface, device authentication data according to a predetermined authentication scheme to enable the device to be identified as a trusted source of the message;

a third hardware logic module configured to apply, to a message received from the second network interface, the predetermined authentication scheme to identify a source of the message received from the second network interface as a trusted source; and a fourth hardware logic module configured to apply, to the message received from the second network interface, a second set of one or more predetermined message content security functions and to output or to block the message received from the second network interface according to the result of applying said second set of one or more functions, wherein the first network interface is linked to the second network interface by a unidirectional data pathway incorporating the first hardware logic module and the second hardware logic module to ensure unidirectional flow of messages from the first network interface to the second network interface by means of the first and second hardware logic modules only and wherein the second network interface is linked to the first network interface by a unidirectional data pathway incorporating the third hardware logic module and the fourth hardware logic module to ensure unidirectional flow of messages from the second network interface to the first network interface by means of the third and fourth hardware logic modules only.

In this second aspect of the invention, a fully bidirectional device is provided having hardware-implemented message source authentication and message content verification in both of the message pathways through the device.

According to an example embodiment based upon the devices in either of the first or second aspects of the invention, each of the first and the second network interfaces comprises a network interface controller, implemented as a hardware logic module to apply one or more controls to the passage of messages therethrough, and an associated network processor linked to the network interface controller for executing one or more software modules relating to the communication of messages over the respective first or second network and through the hardware logic modules, wherein all messages passing to or from the first or second network processor are arranged to pass through the respective network interface controller.

In an example embodiment, the one or more software modules implement one or more protocol connectors arranged to provide a protocol break in respect of a communication to be established with an entity linked to the respective first or second network.

In a further example embodiment, the one or more software modules include a module implementing flow control means for controlling a respective data flow of messages between the first and second network interfaces by means of the hardware logic modules. The messages may include data messages and flow control messages.

In one example embodiment incorporating the flow control means, each of the network processors are arranged to execute software modules implementing a respective buffer for the queuing of messages relating to a distinct data flow and wherein the flow control means are arranged to manage the storage and the communication of messages of each data flow by the network processors through the hardware logic modules of the device between the respective buffers.

According to another example embodiment, the one or more software modules include a software module arranged to establish a secure communications session over the respective first or second network with a further said network bridge device. This enables to or more devices according to the present invention to cooperate in providing secure communications between higher security networks by means of a lower security network bridged by the devices.

Each of the hardware logic modules and the network processors include event logging means arranged to generate auditable event data.

In an example embodiment, the device further comprises a management network interface including a management controller implemented as a hardware logic module configured to apply one or more controls to the passage of management messages therethrough, and an associated management processor linked to the management controller for executing one or more software modules relating to the communication of management messages over the management network and with the hardware logic modules and network processor modules of the device, wherein all management messages passing to or from the management processor are arranged to pass through the management network interface controller.

To enable remote or local configuration changes to be made to the device, in another example embodiment, the device further comprises a hardware logic module implementing a configuration controller for distributing configuration data, or updates thereto, to one or more of the hardware logic modules of the device or to the one or more of the network processors, wherein the configuration controller is linked to each of the one or more hardware logic modules and network processors by unidirectional pathways and is linked by a unidirectional pathway to the management processor to receive configuration control messages from the management network.

In another example embodiment, to enable auditable event data to be obtained from the device, the management controller is linked by unidirectional pathways to each of the hardware logic modules and to the network processor modules to receive therefrom generated auditable event data for sending over the management network by means of the management processor such that the pathways for conveying auditable event data to the management controller are segregated from the pathways used to convey configuration control messages and from the pathways used to convey messages between the first and second network interfaces.

As a further security measure in a further example embodiment, each of the network processors are arranged to execute software implementing a predetermined data transformation scheme for transforming data carried in messages according to a given protocol into messages according to a common verifiable format for communication through the hardware logic modules of the device or to one or more other said network bridge devices over the respective first or second network.

In a typical application of embodiments of the present invention, a data communications arrangement comprises a first secure network, a second secure network and a third lower security network, wherein entities linked to the first secure network are arranged to communicate messages to entities linked to the second secure network by means of the third lower security network, the data communications arrangement further comprising a first network bridge device according to the first or second aspects of the invention for linking the first network to the third network, and a second network bridge device according to the first or second aspects of the invention for linking the third network to the second network and wherein the first and second network bridge devices are arranged to intercommunicate to provide a secure communications link over the third lower security network for the secure communication of said messages between the entities linked to the first secure network and the entities linked to the second secure network.

A detailed description will now be provided of different embodiments of the present invention, by way of example only, with reference to the accompanying drawings of which:

An example embodiment of the present invention will now be described in which a secure network bridge (SNB) device is provided for use in securing bidirectional data communications between networks, either as a stand-alone device or in collaboration with one or more other SNB devices. A modular representation of the bidirectional SNB device, and its functionality, will firstly be described in outline with reference to FIG. 1. Example configurations of SNB devices in bridging networks securely will then be discussed with reference to FIG. 2 and the functionality of the SNB device will then be described in more detail in the context of a typical application involving two intercommunicating bidirectional SNB devices with reference to FIG. 3 and FIG. 4. An SNB device enforcing a unidirectional data flow but with the option of a return path for internal flow control messages will then be described according to a further example embodiment as an optional alternative to the bidirectional device.

Figure 1:
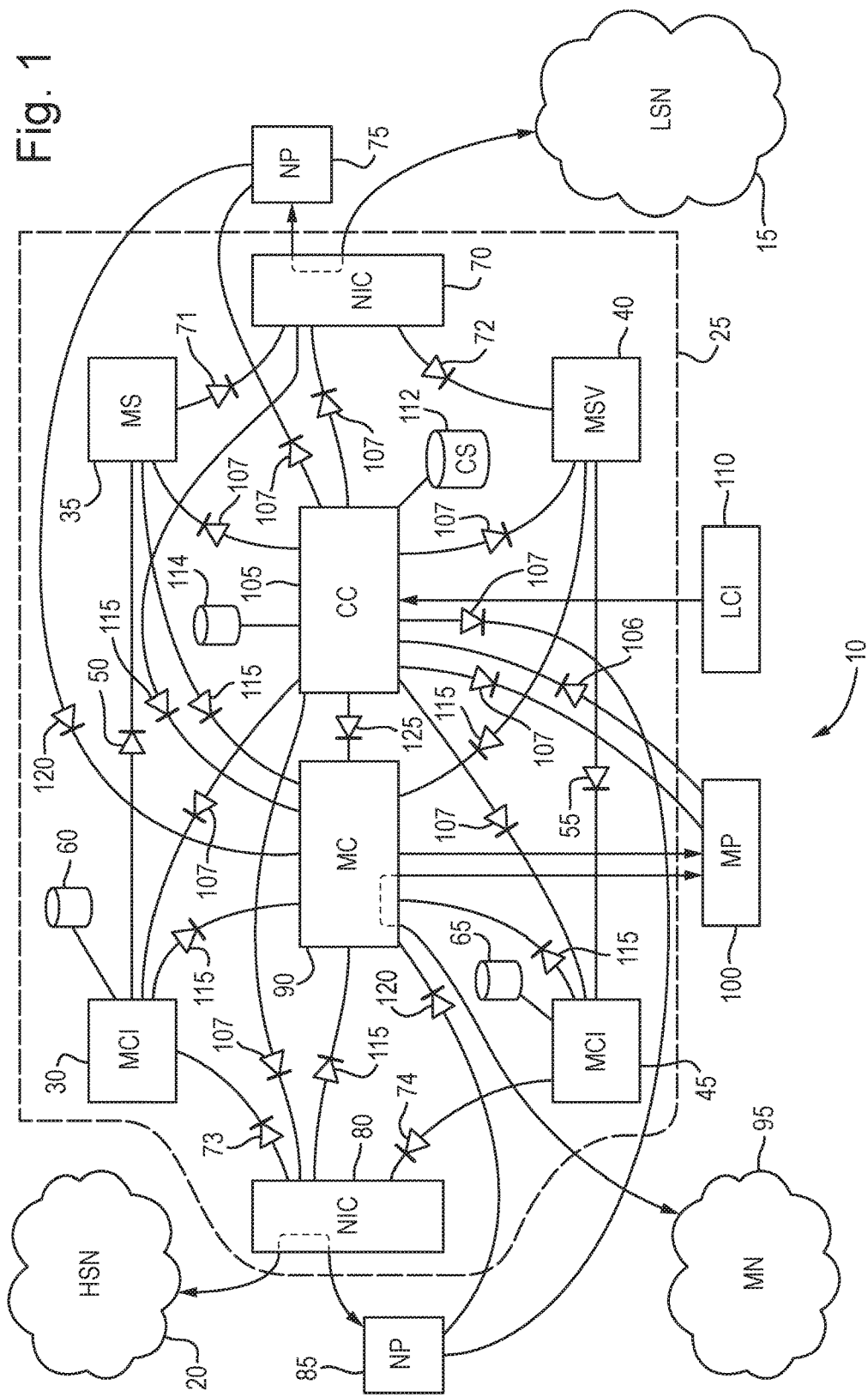
FIG. 1 shows a modular representation of a bidirectional secure network bridge device according to one embodiment of the present invention.

Referring firstly to FIG. 1, a modular representation of a secure network bridge (SNB) device 10 is shown. The SNB device 10 may implement network segregation between a first, potentially less secure (LSN) network 15 such as a Wide Area Network (WAN) and a higher security network (HSN) 20, such as a Local Area Network (LAN).

The SNB device 10 comprises an assembly 25 of hardware logic modules and a number of associated digital processors for executing software, this combination being arranged to implement, amongst others, the following features:

unidirectional pathways through the SNB device with enforced unidirectional data flows through the hardware logic modules such that each unidirectional pathway includes hardware-implemented authentication of the source and/or destination of messages and data, for example another SNB device, structural verification of messages and verification of the message data content according to rules defined for each protocol used in communications between a source and a destination entity over the networks 15, 20;

provision of segregated device management (configuration) and audit functionality for each module of the device, the management and audit functionality being further segregated from the data flows through the device;

hardware-implemented control over all network interfaces; and software-implemented protocol connectors to provide software ports for interfacing with the connected networks, implementing protocol breaks in all end-to-end communications passing through the SNB device 10 and, in the event that two or more SNB devices 10 are being used to bridge a lower security network, to establish secure communications channels between the SNB devices 10.

In a typical implementation of the SNB device 10, a hardware-implemented and trusted assembly of modules 25 is interfaced with three software modules providing software ports: data; data; and management/control. At the core of the SNB device 10 is the assembly 25 of hardware logic modules, including four field-programmable gate array (FPGA) devices 30, 35, 40 and 45 arranged as authentication and verification pairs in two segregated unidirectional pathways.

In a first pathway, a first Message Content Inspection (MCI) module 30 is configured to perform structural verification of messages and verification of message data content flowing from the higher security network (HSN) 20 to the lower security network (LSN) 15. A Message Signing (MS) module 35 is configured to apply a digital signature or other verifiable form of indication to messages, after verification by the first Message Content Inspection module 30, that this SNB device 10 is the trusted gateway for those messages before they pass to the lower security network 15. The Message Signing (MS) module 35 may also be arranged to include a unique identifier for the SNB device 10 in all messages passing through to reinforce a trust relationship, the unique identifier having been allocated to the SNB device 10 at the time of commissioning. The first Message Content Inspection module 30 may also be arranged to verify any digital signatures applied externally to messages and data received from the higher security network 20.

In a second pathway, a Message Signature Verification (MSV) module 40 authenticates a digital signature or other authentication mark applied to messages received over the first network 15, for example from another SNB device 10, to verify that the messages have been sent over that network 15 from a trusted source. Also in that second pathway, a second Message Content Inspection (MCI) module 45 verifies the structure of messages and the content of message data whose source was authenticated by the Message Signature Verification module 40 before they pass to the second network 20. The passage of any message failing verification by the first or the second Message Content Verification module 30, 45 or failing source authentication by the Message Signature Verification module 40 is blocked within the SNB device 10.

The Message Signing module 35 and the Message Signature Verification module 40 are arranged to establish a trust relationship with a recipient or source of messages, respectively, communicating over the first, potentially less secure network 15. For example, digital signatures and SNB device identifiers may be used to establish a trust relationship with another SNB device 10 so that any message received over the first network 15 whose source/gateway cannot be authenticated by an applied signature or SNB device identifier is rejected.

Unidirectional data flow through the first pathway is assured by linking the first Message Content Inspection module 30 and the Message Signing module 35 by means of a unidirectional hardware buffer 50 or by another type of unidirectional device. Similarly, through the second pathway, unidirectional data flow is assured by a further unidirectional hardware buffer 55, linking the Message Signature Verification module 40 and the second Message Content Inspection module 45. The unidirectional buffers 50, 55 may be implemented using low-voltage differential signal converters, for example. By imposing unidirectional data flow through the pathways between hardware logic modules, a 'downstream' module is prevented from modifying the behaviour of an 'upstream' module. This is a significant security benefit of the architecture of the SNB device 10 according to the present invention.

In order to carry out verification of the data content of messages received from the second, higher security network 20, the first Message Content Inspection module 30 is linked to a first reference data store 60 whose contents define: rules to determine whether a message is of a permitted or prohibited type; rules defining permitted message data field structures and data field types; and, for each data field in a defined structure, permitted value ranges, character string lengths, etc., as required. Different verification rules may be stored in respect of each protocol type, each source or destination entity, or each user likely to be communicating messages from entities linked to the second network 20. Similarly, the second Message Content Inspection module 45 is linked to a second reference data store 65 whose contents define similar types of rule in respect of messages destined for the entities linked to the higher security network 20. The first and second reference data stores 60, 65 are implemented as separate data storage modules. The first and second Message Content Inspection modules 30, 45 may be arranged to identify or receive information defining a source and/or destination of received messages, the originating protocol type, etc. and thereby select an appropriate set of rules from the data stores 60, 65 to apply to the verification of message data content.

Also provided within the hardware-implemented assembly 25 are a number of Network Interface Controllers arranged to control respective interfaces—software ports—of the SNB device 10 with connected networks, in particular with the first and second networks 15, 20. Each network interface of the SNB device 10 comprises a Network Interface Controller module, implemented using an FPGA device, and a Network Processor for executing software implementing protocol connectors, data transformation and other interfacing software appropriate to the different types of data communication expected by communicating entities linked to the respective network. The Network Processors are also arranged to manage the flow of data messages through each unidirectional pathway through the hardware logic modules, as will be described in more detail below.

To ensure that each FPGA-implemented Network Interface Controller is able to impose controls over the passage of data through its respective network interface and to provide protection for its respective Network Processor, all data incoming from or outgoing to a network is arranged to pass through the respective Network Interface Controller and be subject to functionality implemented in that controller. That functionality may include the blocking of data flow in the event of a detected fault in the SNB device 10, or basic 'firewall' functions that may advantageously be implemented in hardware to render them relatively immune to compromise by external agents. More particularly, each Network Interface Controller is arranged to provide and control an interface between the respective network and the associated Network Processor and between the Network Processor and other hardware logic modules of the assembly 25 such that all data flowing between a network and elements of the SNB device 10 must pass through a respective Network Interface Controller.

In the SNB device 10, a first Network Interface Controller (NIC) 70 is provided to control an interface with the first, lower security network 15, in particular to control the passage of data to and from an associated first Network Processor (NP) 75 and to control the passage of data to and from other hardware logic modules of the assembly 25. In particular, a unidirectional pathway is provided from the Message Signing module 35 to the first Network Interface Controller 70, incorporating a unidirectional hardware buffer 71. A further unidirectional hardware buffer 72 enforces unidirectional flow of data along a pathway from the first Network Interface Controller 70 to the Message Signature Verification module 40.

A second Network Interface Controller (NIC) 80 is provided to control an interface with the second, higher security network 20, in particular to control the passage of data to and from an associated second Network Processor (NP) 85 and to control the passage of data to and from other hardware logic modules of the assembly 25. In particular, a unidirectional pathway is provided from the second Network Interface Controller 80 to the first Message Content Inspection module 30, incorporating a unidirectional hardware buffer 73. A further unidirectional hardware buffer 74 enforces unidirectional flow of data along a pathway from the second Message Content Inspection module 45 to the second Network Interface Controller 80.

The functionality of software executing on the first and second Network Processors 75, 85 may be summarised as providing a 'protocol-level' break to communications sessions being established between entities linked to the first and second networks 15, 20. This enables the Network Processors 75, 85 to transform received data such that it may be communicated within the SNB device 10 or between communicating SNB devices 10 using a common verifiable protocol, data structure or messaging scheme, independent of any protocol being used in communications between the communicating entities, and so protect against protocol-based vulnerabilities.

The Network Processors 75, 85 comprise digital processors implemented as single-board computers (SBCs) arranged to execute one or more software modules whose specific functionality is tailored to the respective network type, the protocols being used to communicate data by entities linked to that network and the types of data being communicated. In particular, one or more Protocol Connectors (not shown in FIG. 1) may be executed by the Network Processors 75, 85 to provide that protocol break in respect of each protocol used in end-to-end communications over the networks 15, 20. Each Network Processor 75, 85 is also arranged to execute software implementing brokering and queuing functionality (not shown in FIG. 1) for managing potentially multiple parallel communications sessions established by the protocol connectors and their interface to the hardware logic modules of the assembly 25. The role of the software-implemented modules in a typical end-to-end communications session will be described in more detail below in a typical application in which two or more cooperating SNB devices 10 are used to bridge two or more higher security networks by means of the first, lower security network 15.

The first and second Network Processors 75, 85 may also implement a range of data message and message content verification functionality, as will be discussed below, to compliment or replicate the verification functionality implemented by the hardware Message Content Inspection modules 30, 45. While inherently less secure than its hardware-implemented equivalent, software-implemented verification functionality may be made more complex or algorithmic than may conveniently be implemented or maintained in hardware. Thus the SNB device 10 may implement a layered approach to verification and authentication, incorporating such functionality in both hardware and software. The flexibility provided by the software verification layer enables a rapid response to a new security threat to be implemented while allowing time to design and install a more secure hardware-implemented equivalent.

Content verification in the form of structural verification, data content validation and any other forms of content checking is implemented independently within each of the unidirectional pathways through the SNB device 10, whether that verification relates to data originating in a higher security network 20 or a lower security network 15.

The software-implemented interfaces (software ports) executing on the Network Processors 75, 85 may be rapidly upgraded to accommodate further protocols and to update the configuration of any software-implemented verification functionality using a configuration interface to the SNB device 10 that provides remote access for the implementation of certain types of configuration change. In operation, the software-implemented interfaces (75, 85) are under the control of the trusted hardware-implemented Network Interface Controller modules 70, 80 which, along with the other configurable hardware-implemented authentication and message data content verification modules 30-45, are subject to the same levels of security in receiving and implementing configuration updates. This ensures a very high level of assurance in the authentication and verification of messages being communicated via those software ports while retaining configuration flexibility in the network interfaces.

The assembly 25 of hardware logic modules may include a hardware logic module in the role of a further network interface controller—a Management Controller (MC) 90—designed to secure an interface with a Management Network (MN) 95 via a Management Processor (MP) 100. All communications over the Management Network 95 are required to pass through the Management Controller 90, such communications including the transfer of logged event data accumulated by the SNB device 10 and the receipt of remote configuration updates by the SNB device 10.

A Configuration Controller (CC) 105 is also included in the assembly 25 of hardware logic modules, arranged to control all configuration changes that may be made to update operation of modules of the SNB device 10. While configuration may be considered a part of the overall management functionality of the SNB device 10, the provision of a separate hardware-implemented Configuration Controller 105 ensures segregation of configuration access to the hardware and software modules of the device 10 from audit pathways used to convey logged event data from those modules out of the SNB device 10, as will be discussed below. Configuration functionality and access is also thereby segregated from the data pathways through the device between the Network Processors 75, 85.

The Configuration Controller 105 is arranged to control a configuration interface for remote implementation over the Management Network 95 of configuration changes to the SNB device 10. The Configuration Controller 105 is also arranged to distribute configuration data within the SNB device 10 to the hardware logic modules of the assembly 25 and to the Network Processors 75, 85 on start-up or in the event of a device reset.

Remote access over the Management Network 95 is provided to the Configuration Controller 105 within the SNB device 10 by means of the Management Processor 100 over a unidirectional communications pathway secured by a unidirectional hardware buffer 106 from the Management Processor 100 to the Configuration Controller 105. Further unidirectional pathways are provided from the Configuration Controller 105 to each of the configurable modules of the SNB device 10, including the software-implemented elements—the Network Processors 75, 85 and the Management Processor 100—and the hardware logic modules 30, 35, 40, 45, 70, 80 of the assembly 25 for which remotely-controlled firmware updates may be implemented. Each such unidirectional pathway is secured by unidirectional hardware buffers 107 and enables the distribution of configuration data and updates by the Configuration Controller 105 to elements of the SNB device 10. All control communications received by the SNB device 10 over the Management Network 95 are required to pass digital signature verification implemented by the Configuration Controller 105.

A user having network configuration and supervisory authority may access the SNB device 10 from a remote location over the Management Network 95 to make changes under the control of the Configuration Controller 105 to the configuration data and software-implemented components executing on the Network Processors 75, 85, for example to add protocol connectors, and to make firmware updates to certain of the hardware logic modules of the assembly 25.

For the most security-critical configuration changes, the Configuration Controller 105 is arranged to secure a direct access interface to the SNB device 10 via a Local Configuration Interface (LCI) 110. The most security-critical configuration changes may only be made by direct access using the Local Configuration Interface 110 by authorised users, physically present, able to satisfy stringent user validation checks imposed by the Configuration Controller 105. The security-critical configuration changes may include changes to private encryption/decryption keys and digital certificates and initial commissioning of the SNB device 10. Some types of firmware change may also be initiated only via the Local Configuration Interface 110. A store 112 is provided within the assembly 25 for use by the Configuration Controller 105 to store encryption/decryption keys, digital certificates and other security-critical configuration data which may be altered only via the Local Configuration Interface 110. A further store 114 is provided for use by the Configuration Controller 105 to store all the other operational configuration data, including that which is distributed within the SNB device 10 upon start-up or device reset.

The configuration of the Network Interface Controllers 70, 80 may be alterable by configuration updates received under the control of the Configuration Controller 105. Configuration updates to software-implemented components installed on the Network Processors 75, 85 may be applied via the respective Network Interface Controller 70, 80 and, if required, all such updates to software-implemented modules and their configuration may be subject to that same level of control.

All event data logged by the SNB device 10 may be queued within the Management Processor 100 and sent to a remote Management Unit (MU) (not shown in FIG. 1) or other secure capture point over the Management Network 95 as a continuous process, for auditing and monitoring purposes. All such communications are sent over encrypted communications connections established by the Management Processor 100 under the control of the Management Controller 90 with the intended destination for such data. Queuing of log data allows for the possibility that the MU cannot be contacted from time to time.

Event data may be generated and logged, for example in the event that a message or a data packet is blocked within the SNB device 10, by the respective Message Content Verification module 30, 45 or by the Message Signature Verification module 40 that blocked the message. The hardware-implemented Management Controller 90 comprises an FPGA hardware logic device configured to receive notification of generated events by the first and second Message Content Verification modules 30, 45 or by the Message Signature Verification module 40, capturing or generating a predetermined set of information for each different type of event in which data are blocked by the SNB device 10, or otherwise found relevant to an auditable event, and to perform any necessary verification of the events being notified.

The Management Controller 90 is linked to each of the first and second Message Content Verification modules 30, 45, the Message Signing module 35, the Message Signature Verification module 40 and each of the first and second Network Interface Controllers 70, 80 by hardware-controlled audit pathways, making use of unidirectional hardware buffers 115. This ensures, in particular, that event information may be received from the modules 30-45, 70, 80 but that any data flow from the Management Controller 90 to any of the modules 30-45, 70, 80 is prevented. The hardware-controlled management of flow along these pathways also permits acknowledgement messages to pass to the Management Controller 90 for acknowledgement of configuration updates, to be communicated onward over the Management Network 95. In this way, segregation of the message verification and authentication functions from audit functions is established and maintained.

Auditable events may also be generated by the first or second Network Processors 75, 85 or by their respective Network Interface Controllers 70, 80 and may be communicated to the Management Controller 90 by means of unidirectional communications channels from the Network Processors 75, 85 to the Management Controller 90, secured by unidirectional hardware buffers 120. Segregation is also enforced between the audit functions of the Management Controller 90 and the configuration functions of the Configuration Controller 105 by a further unidirectional buffer 125. This ensures unidirectional communication from the Configuration Controller 105 to the Management Controller 90, for example of auditable events generated by the Configuration Controller 105 when configuration changes are made or attempted, but prevents access to the configuration functionality, or any of the other functionality implemented by the hardware modules of the assembly 25 or by the Network Processors 75, 85.

As indicated above, two or more SNB devices 10 may be used to implement a secure data communications bridge between two or more higher security LANs by means of a lower security network such as a WAN. Four example arrangements involving one or more SNB devices 10 will now be described with reference to FIG. 2 to illustrate some of the principles underlying a typical architecture of inter-communicating SNB devices.

Figure 2A:
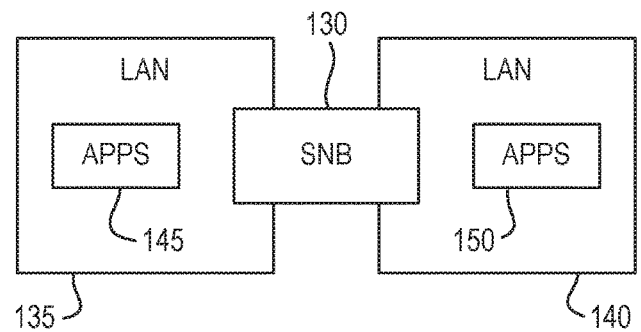
FIG. 2 shows four different example applications of one or more secure network bridge devices of the present invention to different network interconnection arrangements.

Referring firstly to FIG. 2a, a single SNB device 130, substantially the same as the SNB device 10 described above, may be used to provide a secure bridge between two collocated LANs 135 and 140. The SNB device 130 may include within first and second network interface modules (not shown in FIG. 2a) a set of protocol connectors and other interfacing software as required to provide a protocol break and other interfacing functionality in communications sessions being established by applications 145, 150 hosted by entities linked to the respective networks 135, 140. If unidirectional communication is required between the LANs 135, 140, a unidirectional variant of the SNB device 10 may be used for the SNB 130, as will be described in a further example embodiment of the present invention below.

Figure 2B:
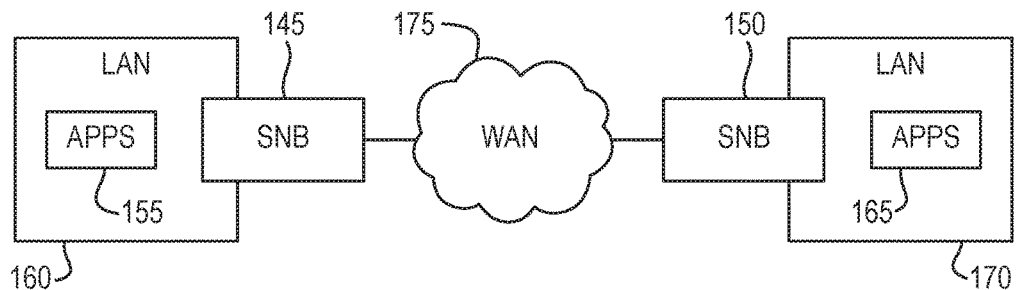

Referring secondly to FIG. 2b, a first SNB device 145 and a second SNB device 150, each substantially the same as the SNB device 10 described above, may be deployed to provide secured data communications between applications 155 hosted by entities linked to a first LAN 160 and applications 165 hosted by entities linked to a second LAN 170 by means of a lower security intermediate WAN 175. As for the FIG. 2a configuration, if unidirectional communication is required between the LANs 160, 170, a unidirectional variant of the SNB device 10 may be used for each of the SNB devices 145, 150, as will be described below.

Figure 2C:
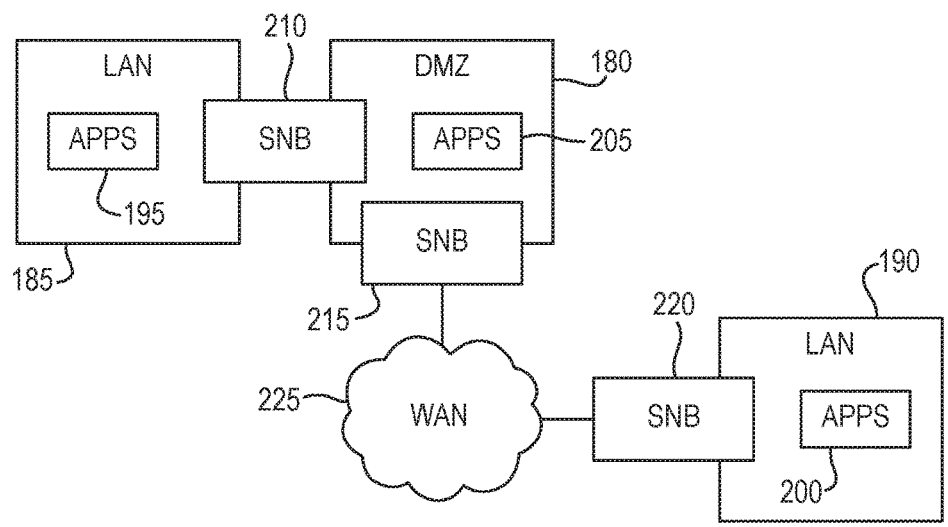

Referring thirdly to FIG. 2c, a so-called 'demilitarised zone' (DMZ) 180 may be secured independently of a first LAN 185 and a second LAN 190 such that all communications between applications 195 hosted by entities linked to the first LAN 185 and applications 200 hosted by entities linked to the second LAN 190 are required to pass through the DMZ 180 and, if required, be exposed to applications 205 executing within the DMZ 180. Three SNB devices may be used in this arrangement: a first SNB 210 for securing communications between the applications 195 hosted by entities linked to the first LAN 185 and the applications 205 executing in the DMZ 180; and a second and third SNB 215, 220 for securing communications between the applications 205 executing in the DMZ 180 and the applications 200 hosted by entities linked to the second LAN 190 by means of an intermediate lower security network (WAN) 225. As for the FIGS. 2a and 2b configurations, a unidirectional variant of the SNB device 10 may be used as one or more of the SNB devices 210, 215, 220, as will be described below.

Figure 2D:
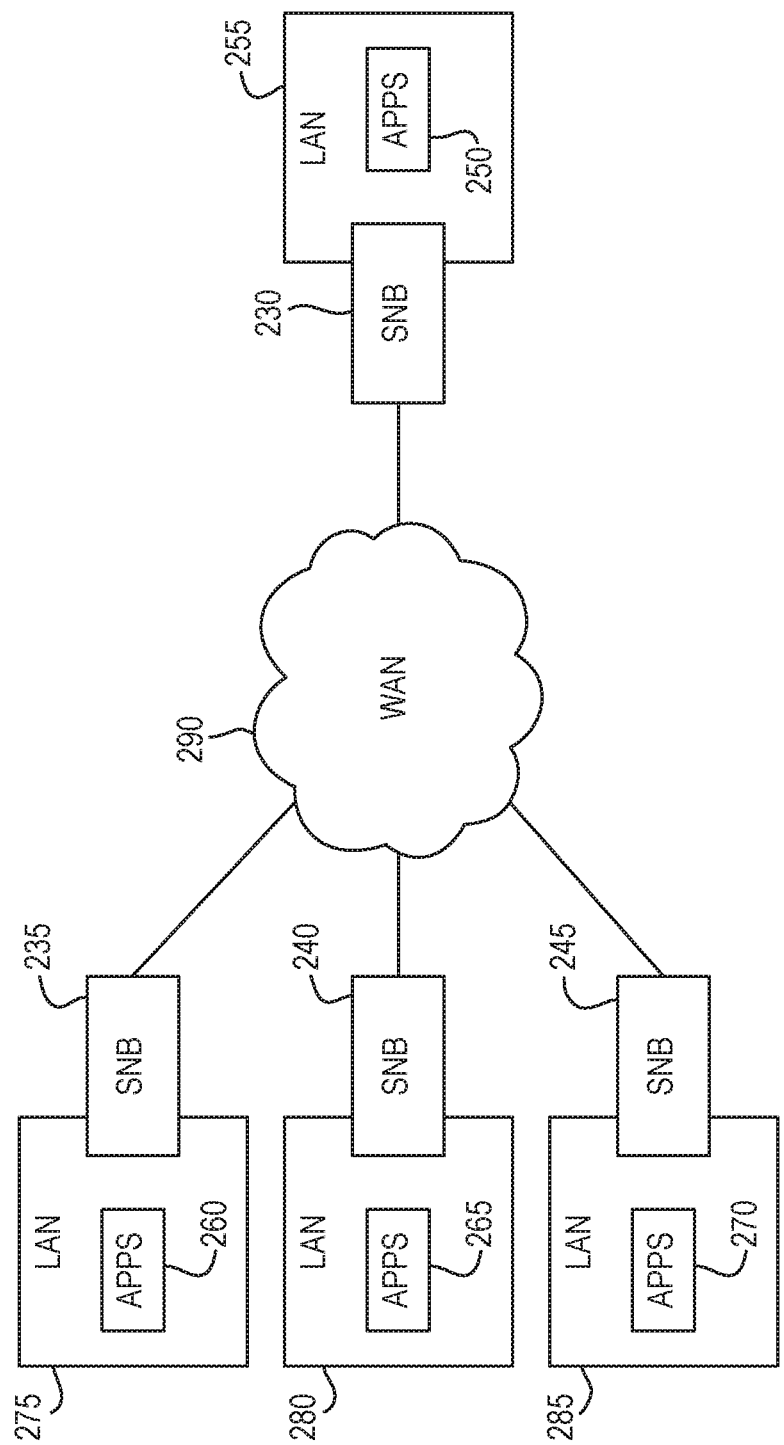

Referring fourthly to FIG. 2d, an example arrangement of four SNB devices 230, 235, 240, 245, each similar to the SNB device 10 described above, is provided to secure communications between applications 250 hosted by entities linked to a first LAN 255 and applications 260, 265 and 270 hosted by entities linked to three further LANs 275, 280 and 285 respectively, by means of an intermediate WAN 290. The three further LANs may relate to three different sites, for example industrial sites having equipment and processes that are to be controlled from the first LAN site (255). That is, the SNB device 230 is arranged to operate separately with each of the three other SNB devices 235, 240, 245 to establish secure communications channels over the WAN 290. Of course, more than three further SNB devices may be deployed to communicate with the SNB device 230 or with each other in various combinations, as required. Once again, a unidirectional variant of the SNB device 10 may be used as one or more of the SNB devices 230, 235, 240 and 245, as will be described below.

It will be clear that there are many other possible configuration options involving one or more SNB devices, deployed in any practical number to intercommunicate in various combinations over different network architectures, as required, each falling within the scope of the present invention and exploiting the functionality of the SNB device 10 as described above and in further detail below, or a unidirectional variant thereof, as would be apparent to a person of ordinary skill in the relevant art. One such arrangement, similar to that shown in FIG. 2b and based upon bidirectional SNB devices, will now be described in more detail with reference to FIG. 3 in the example context of a group of personnel with operational responsibility for critical equipment located at a remote industrial site.

Figure 3:
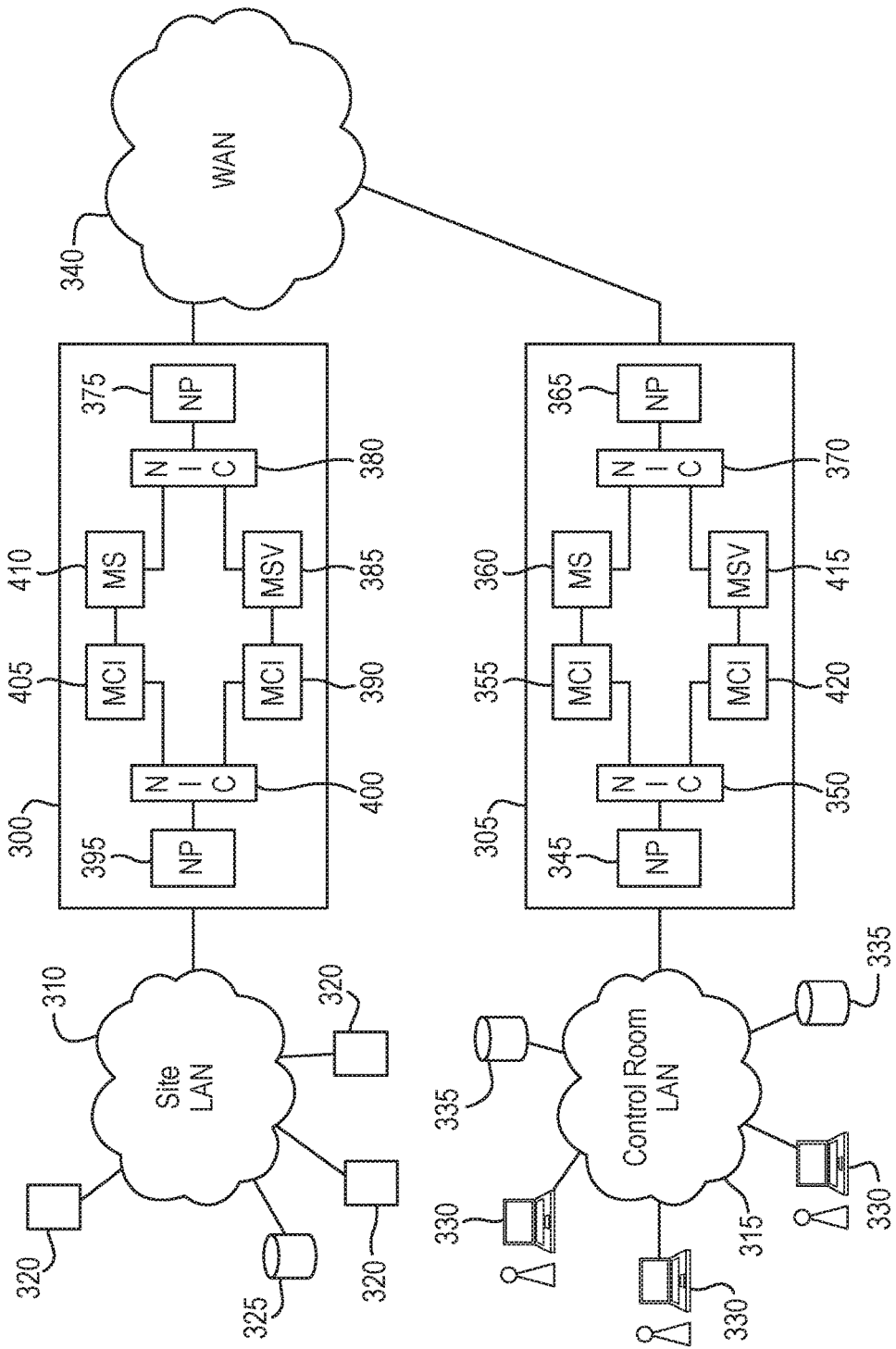
FIG. 3 shows one example network interconnection arrangement involving two secure network bridge devices according to the present invention.

Referring to FIG. 3, two SNB devices 300, 305, each similar to the SNB device 10 described above, are arranged to provide a secure communications bridge between a Site LAN 310 deployed at an industrial site and a Control Room LAN 315 provided at a Control Room location remote from the industrial site, over an intermediate WAN 340. Industrial Equipment 320 and Servers of an Industrial Control System (ICS) 325 are linked to the Site LAN 310 while operational personnel are located at the Control Room location with access to Terminal Equipment 330 and Servers 335 linked to the Control Room LAN 315. Operators in the Control Room have a requirement to communicate with various items of Industrial Equipment 320 and ICS Servers 325 at the Industrial Site, for example to issue control commands to the Equipment 320, to interrogate SQL databases stored on the Servers 325, or to receive data being output by the Equipment 320, including status data and alarm signals. Communications between the Site LAN 310 and the Control Room LAN 315 are required to pass over the intermediate WAN 340, likely to be a lower security network than either of the LANs 310, 315. The two SNB devices 300, 305, as deployed, are configured to provide a secure communications bridge over the WAN 340 to enable secure bidirectional communication of messages and data between the Control Room and the Industrial Site.

From a security perspective, the present invention is intended to address a number of different risks likely to arise from the different potential sources of compromise of data or communications, for example in the arrangement of FIG. 3, the nature of which are likely to vary according to the context of the application. For example, if the industrial site is an oil or gas production facility located in a remote region, then aside from the physical security of the site itself (which may include physical access to the SNB equipment 300) the data and communications security risks addressed by the present invention are likely to relate to the different ways in which an attacker might gain remote access to the different networks 310, 315 or 340 so as to interfere with communications to or from the Equipment 320 and cause physical or economic harm to the facility. For example:

potential compromise of the Site LAN 310 may enable falsified control signals to be sent to interfere with operation of the Equipment 320 with potentially catastrophic effects, or enable data being output by the Equipment 320 to be altered to disguise the effects of that interference until damage has been done;

potential compromise of the Control Room LAN or infiltration by a rogue operator leading to unauthorised communications with the Equipment 320, for example with the same aims and effects as for compromise of the Site LAN 310, above; or potential compromise of the WAN 340 may enable interference with communications in either direction between the Equipment 320 or ICS Servers 325 and the Control Room Servers 335 when in transit over the WAN 340.

The features of the SNB device 10, outlined above with reference to FIG. 1, may be applied to address these different types of data and communications compromise through:

authentication, using digital signatures, and encryption of all data and messages, including acknowledgments, passing between the two SNB devices 300, 305 and of all configuration update messages sent to the SNB devices 300, 305;

verification of the data structure and content of messages being communicated from the Equipment 320 or ICS Servers 325 linked to the Site LAN 310 to entities linked to the Control Room LAN 315;

verification of the data structure and content of messages being sent from the Control Room Terminal Equipment 330 or Servers 335 linked to the Control Room LAN 315 to the Equipment 320 or ICS Servers 325 linked to the Site LAN 310;

implementation of message source authentication, structural verification of messages and data and control over configuration of the SNB devices 300, 305 using hardware modules that are virtually impossible to compromise through remote access, ensuring a trusted communications relationship between cooperating SNB devices 300, 305; and segregation of audit and configuration functionality from message authentication and data content verification functionality within the SNB devices 300, 305 substantially to eliminate opportunities for compromise of the key data message authentication and verification functionality of the SNB devices 300, 305 through any compromise of the audit or configuration functionality. Compromise of the configuration would allow compromise of data, e.g. by disabling prohibited address lists. Segregation prevents the data handling functionality corrupting the configuration which in turn would compromise other data communications.

Figure 4:
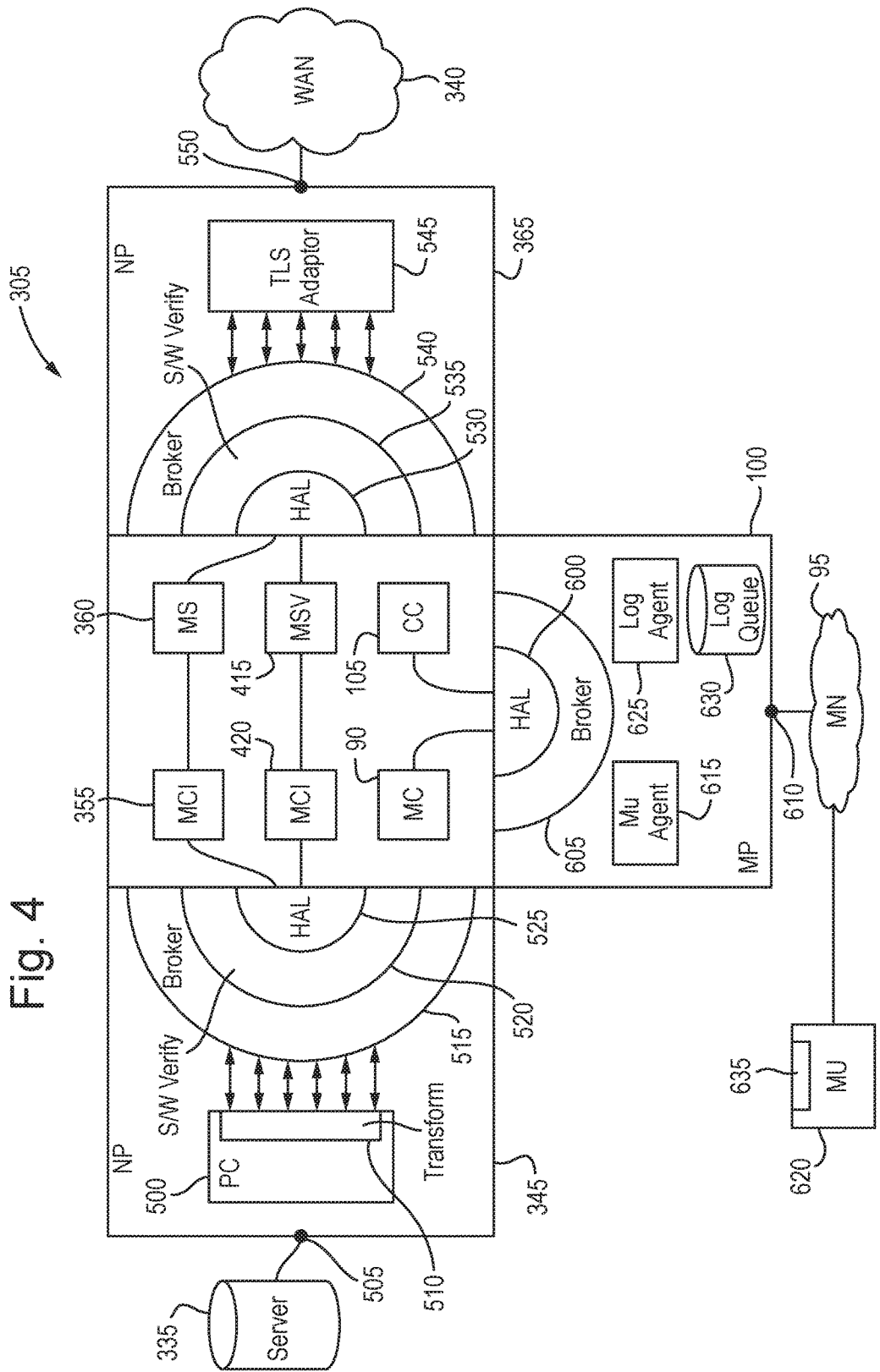
FIG. 4 illustrates in more detail the functionality of the Network Processors and the Management Processor of a secure network bridge device, according to a further embodiment of the present invention.

A typical sequence of steps in the end-to-end communication of a data message and its data content from a source system such as a Server 335 linked to the Control Room LAN 315 to a destination system such as an ICS Server 325 linked to the Site LAN 310 though the arrangement shown in FIG. 3 will now be described, additionally with reference to FIG. 4. FIG. 4 shows a simplified example of a logical structure for those elements of an SNB device, the device 305 in particular, involved in the first stage of such a communication. Substantially the same logical structure applies to the SNB device 300.

Referring to FIG. 3 and to FIG. 4, the first step is to initiate a communication from the higher security side—the Network Processor (NP) 345 of the SNB device 305—in particular by a relevant Protocol Connector (PC) 500 executing on the Network Processor (NP) 345 via a Network Interface Controller (NIC) 350 (not represented in FIG. 4) and a Network Connection 505 to the site LAN 310.

Communications would typically be initiated from the higher security side of an SNB device 300, 305 as a matter of policy. In a typical application, the Protocol Connector 500 'subscribes' to receive certain types of message data from the Server 335 through polling of the Server 335. The Server 335, in turn, 'publishes' messages and data to be communicated to the Network Processor 345. A software driver module supplied by the SNB 305 and installed on the Server 335 would typically perform the Server-side (335) role in the interplay between the Server 335 and the Protocol Connector 500 to initiate the communication. In that way, involvement of the SNB 305 in the communication is transparent to any respective applications executing on the Server 335. From their perspective, the Server 335 is initiating a communication with a selected destination system on the Site LAN 310. The Protocol Connector 500 is therefore arranged to establish an end-to end connection with the Server 335 under the relevant protocol for the communication and to receive data messages over that connection, so providing a Protocol Break.

Data received from the Server 335 by the Protocol Connector 500 is firstly transformed by a data Transformation module 510 of the Protocol Connector 500 into a common verifiable format, for example the well-known 'Protobuf' format, developed initially by Google Inc. The Transformation module 510 of each type of Protocol Connector 500 implemented by the SNB device 305 transforms data into a respective sequence of Protobuf messages.

The Protocol Connector 500 allocates a flow identifier to the data messages of each distinct communications session (data flow). For each new data flow, the Protocol Connector 500 is arranged to establish a TCP connection for the data flow with a Broker module 515 executing on the Network Processor 345, adding the allocated flow identifier to the header of each TCP message packet and maintaining a table of the mappings of flow identifiers to TCP connections for all currently active data flows. The Broker module 515 is able to perform a multiplexing function enabling it to accept multiple TCP connections from the different Protocol Connectors 500 installed on the Network Processor 345, according to the number of simultaneous connections being established with the SNB 305, and to maintain a respective one of a limited number of first-in-first-out (FIFO) buffers to queue received data messages in each of the currently active data flows.

The Broker 515 passes the received messages of a data flow through a Software-implemented Verifier 520 designed to carry out one or more types of message and content verification, including more complex content verification functions that are less easily implemented in a hardware logic module, supplementing any further message content and structural verification to be performed later by the hardware-implemented Message Content Inspection (MCI) module 355. Verified data messages are then passed to a Hardware Access Layer (HAL) module 525 arranged to present a software interface to the hardware logic modules of the SNB device 305. The Hardware Access Layer module 525 is arranged to send one message at a time into the hardware logic modules, in particular to the first Message Content Inspection (MCI) module 355 via the first Network Interface Controller 350.

Following structural verification and any further content verification by the Message Content Inspection module 355, the data messages satisfying checks performed in the module 355 are signed by the Message Signing module 360 and received by a Hardware Access Layer module 530 installed and executing on the second Network Processor 365. The Hardware Access Layer module 530 presents an equivalent software interface to the hardware logic modules of the SNB device 305 for use by software modules executing on the second Network Processor 365. In particular, a Software-implemented Verification module 535 is provided, having substantially the same functionality as the Software-implemented Verification module 520 of the first Network Processor 345 and so providing a second check on the message and its content before passing it to a Broker module 540 for queuing in a respective FIFO buffer for the data flow and for communicating, using one or more TCP connections that the Broker 540 establishes with a Transport Layer Security (TLS) Adaptor 545 executing on the second Network Processor 365 which in turn is arranged to establish a secure communications session over the WAN 340. The TLS protocol is defined for example in documents RFC 5246 and RFC 6176 published by the Internet Engineering Task Force (IETF).

The Broker 515 is arranged to implement a flow control process within the SNB device 305, in conjunction with the Broker 540, to manage the data flow of transformed data messages that it sends through the hardware logic modules of the SNB 305. The flow control process enables multiple different protocol connectors 500 to share the same single data path through those hardware logic modules 355, 360 of the SNB 305. The flow control process is operated according to the principle that it is undesirable to block the single data pathway through the hardware logic modules 355, 360 with data messages for a particular data flow if the receiving Broker 540 does not have free FIFO buffer space to receive more messages for that data flow, for whatever reason. To ensure that data messages are not sent through the hardware modules 355, 360 unless the receiving Broker 540 has enough FIFO buffer space to receive them, the Broker 515 maintains a model of the receiving FIFO buffer in the Broker 540 for each data flow. The model is based upon a knowledge of how many bytes of data the Broker 515 has sent through the hardware modules 355, 360 for a given data flow and, using a 'back-pressure token' scheme, a knowledge of how many of the bytes sent have been received and buffered by the Broker 540. When a configurable number of bytes have been sent for a particular data flow, a scheduling function in the Broker 515 generates a back-pressure token for that data flow and sends the token through the hardware modules 355, 360 where it is checked for valid structure and content and signed according to the authentication scheme operated by the Message Signing module 360.

The back-pressure token is received by the Network Processor 365 and is subject to the same processing as for data messages, including content verification by the Verifier 535 and, if there is spare capacity, storage in a FIFO buffer allocated by the Broker 540 for the data flow. When the Broker 540 receives a backpressure token into the respective FIFO buffer, it returns the token back over the unidirectional return pathway through the hardware logic modules, including a Message Signature Verification Module 415 and a second Message Content Inspection module 420 where the back-pressure token is subject to the same checks as for other message types. Having been signed within the device by the Message Signing module 360, the returned back-pressure message should be passed by the Message Signature Verification module 415 and its content passed by the second Message Content Inspection module 420. Upon receipt of the returned back-pressure token, the Broker 515 determines that all the data messages that it sent prior to generating and sending that particular back-pressure token have been received and buffered by the Broker 540, indicating that data messages are flowing across any onward communications connections, and that the receiving FIFO buffer in the Broker 540 for that data flow is now ready to receive further data messages. A Broker of a Network Processor linked to a lower security network, e.g. the Broker 540, will not itself generate back-pressure tokens. It will only return received back-pressure tokens generated in a network interface to a higher security network.

As a further safeguarding feature of the flow control process, to ensure that the Broker 540 has not terminated a data flow, the Broker 515 periodically generates a so-called 'heartbeat' message for each currently active data flow and sends it through the hardware logic modules 355, 360 as for the data messages and back-pressure tokens. Upon receipt of a heartbeat message into the respective FIFO buffer, the Broker 540 returns the heartbeat message over the return path through the hardware logic modules 415, 420. If the Broker 515 does not receive a heartbeat message that it sent for one of its currently active data flows after a configurable period of time, it terminates the data flow. The Broker 515 may also generate so-called 'broker heartbeats' to be returned by the receiving Broker 540 with the aim of checking that a data pathway is still functional even if no data flows are currently active. The Broker 540 of a Network Processor 365 interfacing to a lower security network 340 will not itself generate heartbeat messages or back-pressure tokens and will only return received heartbeat messages if they relate to one of the currently active data flows as recognised by the Broker 540.

Backpressure tokens and heartbeat messages are signed and verified along with the other data messages in the respective hardware logic modules 360, 415 respectively. However, if a strictly unidirectional implementation of the SNB device 305 is required, the return pathway through hardware logic modules 415, 420 may be omitted such that any flow control would need to be implemented solely from the perspective of the sending Broker 515.

As would be apparent to a notional skilled person in the relevant art, corresponding flow control functionality and buffering similar to that described above for the Broker 515 may be implemented by the Broker 605 of the Management Processor 100 as regards the handling of received messages over the Management Network 95 and the output of audit data by modules of the SNB device 305 to the Log Agent 625.

The TLS Adaptor 545 is arranged to establish communications sessions over the WAN 340 with a corresponding TLS Adaptor executing on the other SNB device 300, via the second Network Interface Controller 370 (not represented in FIG. 4) and a WAN Network Connection 550. The TLS Adaptor is arranged to implement a predetermined message schema for such communications including, in a header portion: a unique SNB Identifier (SNBID) allocated to the SNB device 305 at the time of commissioning; the corresponding unique SNBID allocated to the destination SNB device 300 (each SNB device in a typical application is arranged to store the SNBIDs of all the other SNB devices it is likely to communicate with); the unique Flow Identifier passed with the data messages from the Broker 515; and a digital signature, added by the Message Signing module 360 using a private key stored in the SNB device 305 to enable the receiving SNB device 300 to verify the SNB device 305 as being a valid originator of such messages. Typically the SNBID of the destination SNB device is determined and applied to the communication by the Protocol Connector 500 so that it may be used by the TLS Adaptor 545 to route the communication to the correct destination SNB device over the WAN 340. The source SNBID of the sending SNB device 305 is applied to the communication preferably by the Message Signing module 360. The data messages may be encrypted using a conventional encryption technique selected for the level of security required for communications over the WAN 340, using encryption/decryption keys stored in the respective SNB device 305, 300.

For messages received from the other SNB device 300, the TLS Adaptor 545 is arranged to decrypt the messages and data of the respective communication and forward them over a TCP connection established with the Broker 540. The Broker 540 implements an equivalent flow control process to that described above for the Broker 515 in order to control the flow of received data messages through the SNB device 305, queuing the received data messages, passing them through the Software-implemented Verifier 535 and to the Hardware Access Layer 530 for sending through the hardware logic Message Signature Verification module 415 to verify the signature applied by the sending SNB device 300. If authenticated, the data messages is then passed to the second Message Content Inspection module 420 for structural verification against the predetermined schema, and to carry out any other types of content verification to supplement that performed in software (535). The Verified messages and data are then passed via the Hardware Access Layer 525 of the first Network Processor 345 through substantially the same Software-implemented Verification functionality 520 as implemented on the second Network Processor 365, before reaching the Broker 515. The Broker 515 establishes a TCP connection with an appropriate Protocol Connector 500 arranged to transform (510) the messages and data into their original format and then to implement a communications session with the intended recipient system for the communication over the Control Room LAN 315. This latter communication may, for example, use a similar publish and subscribe protocol between the respective Protocol Connector 500 and an SNB driver module installed and executing on the destination system.

As for the flow control from the Broker 515 to the Broker 540, the Broker 515 returns any flow control messages to the As would be apparent to a person of ordinary skill in the relevant art, an equivalent communications process to that described above with reference to FIG. 3 and FIG. 4 may be implemented in respect of communications initiated with respect to an item of Equipment 320 or a Server 325 linked to the Site LAN 310.

Optionally, the data Transformation functionality 510 may be carried out externally to the SNB device 305 so that already-transformed data are presented to the Protocol Connector 500.

Software-implemented verification functionality 520, 535 is arranged to supplement or replicate the verification functionality of the hardware logic modules of the SNB devices 300, 305 outlined above, adopting a more flexible implementation of particular types of verification of data structure or data content, defined for example using a regular expression style of rule. Furthermore, additional diagnostic messages may be supported over those available from the hardware-implemented verification modules. The verification rules may be used, e.g. to verify and if necessary restrict the types of Structured Query Language (SQL) command and parameters that may be included in SQL statements contained in a message, with reference to a permitted list stored on or accessible to the respective Network Processor 345, 365, or to check for known malicious character strings, such as rogue Universal Resource Locators (URLs), in messages. For example, permitted SQL statements may be restricted to those defined in a reference list that includes the commands SELECT, DROP, INSERT, DELETE, UPDATE, etc. The Network Processors 345, 365 or the hardware logic Message Content Inspection modules 355, 390, 405, 420 of the SNB devices 300, 305 may also implement a verification rule to restrict the database tables or stored procedures permitted in messages to an explicit list defined by a user. More sophisticated rules may also be defined and implemented in hardware or software-implemented modules of the SNB devices 300, 305, individually or in combination, for example to implement a verification rule designed to reject SQL operations matching pre-configured patterns known to be used in SQL injection attacks. Of course, equivalent rules may be defined to detect and disrupt other predetermined patterns occurring with data messages and message content relevant to other protocols, whether in the messages being sent or in the responses to those messages, e.g. in a response to a database query, where they represent a possible compromise in security of the source or destination entities or their communications.

Such software-implemented functionality may also implement an authentication process with both the source and the intended destination systems for the end-to-end communication to ensure their authenticity, for example to prevent a so-called 'man-in-the-middle' attack. The implementation of such functionality may be determined on a protocol-by-protocol basis.

In a typical application to the control of network access to industrial systems, the Network Processors 75, 85 may implement a so-called 'pluggable' software architecture that enables Protocol Connectors 500, 530 to be added and configured, without needing to change the underlying software implementing the architecture, to support any combination of business protocols selected from a list that includes:

OSIsoft® PI protocols;
Java Database Connectivity (JDBC), access Oracle® and other databases;
file transfer protocols;
file and folder manipulation protocols;
Object Linking and Embedding (OLE) for Process Control (OPC);
Modbus;
Distributed Network Protocol (DNP3);
E-mail;
Remote desktop;
Simplified Network Management Protocol (SNMP);
Syslog;
XML;
Network Time Protocol (NTP).

The Protocol Connectors 500 are implemented to execute on the respective Network Processors 345, 395 in such a way as to support multiple simultaneous instances of the same or different protocols, enabling multiple simultaneous communications connections to be established between communicating entities and to pass messages between those entities in either direction through the SNB devices 300, 305. If required, for example when a source entity wishes to establish a communication using JDBC, the respective Protocol Connector 500 may be arranged to provide bespoke JDBC driver software that may be downloaded to or by the source entity and/or destination entity to be integrated directly into a respective client application, replacing any existing database driver software to facilitate communication via the intervening SNB devices 300, 305.

The Protocol Connectors 500 may provide, additionally, a learning mode of operation during which 'training traffic' may be presented to the SNB devices 300, 305, known to represent permitted source and destination network addresses and data content. The Protocol Connectors 500 may construct a database of permitted characteristics derived from the training traffic, including a list of permitted source and destination addresses, and store those characteristics in a reference store accessible to the respective Network Processor for use by the software-implemented functionality for message verification (520, 535).

Referring to FIG. 4 and additionally to FIG. 1, the functionality of the Management Processor (MP) 100 is shown in more detail in FIG. 4. The Management Processor 100 includes its own Hardware Access Layer (HAL) 600, providing a software interface for use by functionality executing on the Management Processor 100 to the hardware logic elements of the SNB device 305. In particular, the Hardware Access Layer 600 is arranged to pass, in one direction, log data from the Management Controller 90 and to pass, in the opposite direction, configuration updates and any other control messages received over the Management Network 95 to the Configuration Controller 105, as described above.

A Broker module 605 is also installed to execute on the Management Processor 100 having a similar role to the Brokers 515 and 535 of the first and second Network Processors 345, 365, arranged to establish TCP connections with other software modules and to queue messages passing to or from the Hardware Access Layer 600. Those other software modules include: a Management Unit (MU) Agent 615 arranged to establish secure communications links over the Management Network 95 via a Network Connector 610 with a remote Management Unit (MU) 620; a Log Agent 625 arranged to perform a similar role in respect of logged event data to be sent over the Management Network 95; and a Log Queue 630 for queuing logged event data as required, for example according to the availability and bandwidth of a connection over the Management Network 95. Functionality included in each of the MU Agent 615 and the Log Agent 625 for establishing secure communications links may replicate the relevant functionality of the TLS Adaptor 545 for that purpose, making use of TLS encryption and implementing a mutual certificate authentication technique in conjunction with a Signing module 635 installed at the Management Unit 620. As discussed above, the Configuration Controller 105 is arranged to authenticate digital signatures applied to any incoming control message, in particular any message that would be expected to originate from the Management Unit 620.

As discussed above, a unidirectional variant on the SNB device 10, 305 may be implemented according to a further example embodiment of the present invention for use where a unidirectional data flow between or over networks is required. Such a variant provides a more sophisticated gateway arrangement than may be provided by known 'data diode' devices, and includes all the advantageous features described above for the bidirectional device, including content verification, trusted communications authentication, flow control and device management facilities, while still enforcing a unidirectional flow of data messages. An example implementation of a unidirectional SNB device will now be described in terms of the key differences over the bidirectional SNB device 305 with reference to FIG. 4.

Referring to FIG. 4, a unidirectional variant may be implemented in one of two or more configurations, according to whether the device is to enforce a strict unidirectional flow to all message types, including internal flow control messages, or to allow flow control to operate as for the bidirectional device described above while enforcing unidirectional flow of all other message types, in particular of data messages. If unidirectional flow is to be enforced upon all message types, then two possible configurations of the device may be provided, as may be used for example at each end of a strictly unidirectional link between secure networks over a lower security network in the network configuration shown in FIG. 2b for example, where a trusted communications link is to be established between a sending SNB device and a receiving SNB device. In the latter configuration, message signatures may be applied at the sending SNB device and authenticated at the receiving SNB device, justifying a different configuration of the hardware logic modules in the sending and receiving SNB devices. Amongst other modifications as would be apparent to a person of ordinary skill in the relevant art, the sending SNB device in such an arrangement would differ from the SNB device 305 in FIG. 4 in the omission of the data pathway through the hardware logic modules that includes the Message Signature Verification module 415 and the second Message Content Inspection module 420. The receiving SNB device would differ in the omission of the data pathway through the hardware logic modules that includes the first Message Content Inspection module 355 and the Message Signing module 360.

If unidirectional flow is to be enforced upon only data messages, the principle difference in configuration of the unidirectional variant of the SNB device 305 over the bidirectional implementation described above lies in the message verification functionality of the second Message Content Inspection module 420 and the verification functionality of the Network Processors 345, 365. The verification functionality of the modules 420, 345 and 365 is configured to ensure that only flow control message types may pass through the return pathway from the Network Processor 365 of the second network interface to the Network Processor 345 of the first network interface and that no messages of any type may find their way back to the server 335. In particular, a strict message schema may be applied by the Software Verifier 535 and the second Message Content Inspection module 420 to allow only flow control (back-pressure tokens) and heartbeat messages to pass through to the Broker 515 of the Network Processor 345 and for all other message types to be blocked. This allows trusted and secured unidirectional communications to be established and to operate between a pair of unidirectional SNB devices over a low security network 340, substantially as described above with reference to FIG. 3, but with full flow control through each SNB device being support substantially as described above. Advantageously, this unidirectional variant of the SNB device may be re-configured to operate as a bidirectional SNB device, or vice versa, with little more than a firmware update.

In a further example embodiment of the present invention, a single SNB device in a unidirectional or bidirectional configuration may be implemented with a full range of protocol connectors in each of the first and second network interfaces serving each of the networks it is intended to bridge, so providing a self-contained device to secure end-to-end communications between entities linked to those two networks.

The description of example embodiments of a secure network bridge device and its applications provided above is intended to demonstrate a number of principles for the design and operation of such a device, both explicit and implied. The specific examples of functionality and features described may be applied in any reasonably foreseeable selection or combination consistent with those design principles and the scope of the present invention as claimed below is intended to include all such selections and combinations.

The invention claimed is:

1. A network bridge device for applying communications security services to messages passing by means of the network bridge device between a first network and a second network, the network bridge device comprising:
   a first network interface for linking to the first network and a second network interface for linking to the second network;
   a first hardware logic module arranged to receive a message from the first network interface and configured to apply, to the message received from the first network interface, a first set of one or more predetermined message content security functions and to output or to block the message received from the first network interface according to the result of applying said first set of one or more functions;
   a second hardware logic module configured to apply, to the message received from the first network interface, device authentication data according to a predetermined authentication scheme to enable the device to be identified as a trusted source of the message;
   a third hardware logic module configured to apply, to a message received from the second network interface, the predetermined authentication scheme to identify a source of the message received from the second network interface as a trusted source; and
   a fourth hardware logic module configured to apply, to the message received from the second network interface, a second set of one or more predetermined message content security functions and to output or to block the message received from the second network interface according to the result of applying said second set of one or more predetermined message content security functions,
   wherein the first network interface is linked to the second network interface by a unidirectional data pathway incorporating the first hardware logic module and the second hardware logic module to ensure unidirectional flow of messages from the first network interface to the second network interface by means of the first and second hardware logic modules only and
   wherein the second network interface is linked to the first network interface by a unidirectional data pathway incorporating the third hardware logic module and the fourth hardware logic module to ensure unidirectional flow of messages from the second network interface to the first network interface by means of the third and fourth hardware logic modules only.

2. The network bridge device according to claim 1, wherein each of the first and the second network interfaces comprises a network interface controller, implemented as a hardware logic module to apply one or more controls to the passage of messages therethrough, and an associated network processor linked to the network interface controller for executing one or more software modules relating to the communication of messages over the respective first or second network and through the hardware logic modules, wherein all messages passing to or from the first or second network processor are arranged to pass through the respective network interface controller.

3. The network bridge device according to claim 2, wherein the one or more software modules implement one or more protocol connectors arranged to provide a protocol break in respect of a communication to be established with an entity linked to the respective first or second network.

4. The network bridge device according to claim 2, wherein the one or more software modules include a module implementing flow control means for controlling a respective data flow of messages between the first and second network interfaces by means of the hardware logic modules.

5. The network bridge device according to claim 4, wherein the messages include data messages and flow control messages.

6. The network bridge device according to claim 5, wherein each of the network processors are arranged to execute software modules implementing a respective buffer for the queuing of messages relating to a distinct data flow and wherein the flow control means are arranged to manage the storage and the communication of messages of each data flow by the network processors through the hardware logic modules of the device between the respective buffers.

7. The network bridge device according to claim 2, wherein the one or more software modules include a software module arranged to establish a secure communications session over the respective first or second network with a further said network bridge device.

8. The network bridge device according to claim 2, wherein each of the hardware logic modules and the network processors include event logging means arranged to generate auditable event data.

9. The network bridge device according to claim 8, further comprising a management network interface including a management controller implemented as a hardware logic module configured to apply one or more controls to the passage of management messages therethrough, and an associated management processor linked to the management controller for executing one or more software modules relating to the communication of management messages over the management network and with the hardware logic modules and network processor modules of the device, wherein all management messages passing to or from the management processor are arranged to pass through the management network interface controller.

10. The network bridge device according to claim 9, further comprising a hardware logic module implementing a configuration controller for distributing configuration data, or updates thereto, to one or more of the hardware logic modules of the device or to the one or more of the network processors, wherein the configuration controller is linked to each of the one or more hardware logic modules and network processors by unidirectional pathways and is linked by a unidirectional pathway to the management processor to receive configuration control messages from the management network.

11. The network bridge device according to claim 10, wherein the management controller is linked by unidirectional pathways to each of the hardware logic modules and to the network processor modules to receive therefrom generated auditable event data for sending over the management network by means of the management processor such that the pathways for conveying auditable event data to the management controller are segregated from the pathways used to convey configuration control messages and from the pathways used to convey messages between the first and second network interfaces.

12. The network bridge device according to claim 2, wherein each of the network processors are arranged to execute software implementing a predetermined data transformation scheme for transforming data carried in messages according to a given protocol into messages according to a common verifiable format for communication through the hardware logic modules of the device or to one or more other said network bridge devices over the respective first or second network.

13. A data communications arrangement comprising a first secure network, a second secure network and a third lower security network, wherein entities linked to the first secure network are arranged to communicate messages to entities linked to the second secure network by means of the third lower security network, the data communications arrangement further comprising a first network bridge device for linking the first network to the third network, and a second network bridge device for linking the third network to the second network and wherein the first and second network bridge devices are arranged to intercommunicate to provide a secure communications link over the third lower security network for the secure communication of said messages between the entities linked to the first secure network and the entities linked to the second secure network,
   wherein, the first and second network bridge devices each comprises:
      a first network interface for linking to the first network and a second network interface for linking to the second network;
      a first hardware logic module arranged to receive a message from the first network interface and configured to apply, to the message received from the first network interface, a first set of one or more predetermined message content security functions and to output or to block the message received from the first network interface according to the result of applying said first set of one or more functions;
      a second hardware logic module configured to apply, to the message received from the first network interface, device authentication data according to a predetermined authentication scheme to enable the device to be identified as a trusted source of the message;
      a third hardware logic module configured to apply, to a message received from the second network interface, the predetermined authentication scheme to identify a source of the message received from the second network interface as a trusted source; and
      a fourth hardware logic module configured to apply, to the message received from the second network interface, a second set of one or more predetermined message content security functions and to output or to block the message received from the second network interface according to the result of applying said second set of one or more predetermined message content security functions,
      wherein the first network interface is linked to the second network interface by a unidirectional data pathway incorporating the first hardware logic module and the second hardware logic module to ensure unidirectional flow of messages from the first network interface to the second network interface by means of the first and second hardware logic modules only and
      wherein the second network interface is linked to the first network interface by a unidirectional data pathway incorporating the third hardware logic module and the fourth hardware logic module to ensure unidirectional flow of messages from the second network interface to the first network interface by means of the third and fourth hardware logic modules only.

14. A network incorporating a network bridge device for applying one or more security functions to communications passing over the network, wherein the network bridge device comprises:
   a first network interface for linking to the first network and a second network interface for linking to the second network;
   a first hardware logic module arranged to receive a message from the first network interface and configured to apply, to the message received from the first network interface, a first set of one or more predetermined message content security functions and to output or to block the message received from the first network interface according to the result of applying said first set of one or more functions;
   a second hardware logic module configured to apply, to the message received from the first network interface, device authentication data according to a predetermined authentication scheme to enable the device to be identified as a trusted source of the message;
   a third hardware logic module configured to apply, to a message received from the second network interface, the predetermined authentication scheme to identify a source of the message received from the second network interface as a trusted source; and
   a fourth hardware logic module configured to apply, to the message received from the second network interface, a second set of one or more predetermined message content security functions and to output or to block the message received from the second network interface according to the result of applying said second set of one or more predetermined message content security functions,
   wherein the first network interface is linked to the second network interface by a unidirectional data pathway incorporating the first hardware logic module and the second hardware logic module to ensure unidirectional flow of messages from the first network interface to the second network interface by means of the first and second hardware logic modules only and
   wherein the second network interface is linked to the first network interface by a unidirectional data pathway incorporating the third hardware logic module and the fourth hardware logic module to ensure unidirectional flow of messages from the second network interface to the first network interface by means of the third and fourth hardware logic modules only.

* * * * *